United States Patent [19]

Hopkins

[11] Patent Number: 4,598,945
[45] Date of Patent: Jul. 8, 1986

[54] CHILD'S CAR SEAT WITH ATTACHMENT FOR SHOPPING CART

[76] Inventor: David Hopkins, 20038 Beaconsfield, Harper Woods, Mich. 48225

[21] Appl. No.: 769,349

[22] Filed: Aug. 26, 1985

[51] Int. Cl.[4] .............................................. A47C 1/11
[52] U.S. Cl. ........................................ 280/250; 5/94; 224/158; 280/33.99 B
[58] Field of Search .................. 280/33.99 A, 33.99 B, 280/33.99 R, 289 A, 801; 297/232, 250; 224/158; 5/94, 118

[56] References Cited

U.S. PATENT DOCUMENTS

| | | | |
|---|---|---|---|
| 1,429,867 | 9/1922 | Goldsmith | 297/250 |
| 3,351,380 | 11/1967 | Sprague | 280/33.99 B |
| 3,596,986 | 8/1971 | Ragsdale | 297/250 |
| 4,324,430 | 4/1982 | Dimas, Jr. et al. | 280/33.99 B |
| 4,494,684 | 1/1985 | Duyker et al. | 280/289 A |

FOREIGN PATENT DOCUMENTS

| | | | |
|---|---|---|---|
| 15986 | of 1899 | United Kingdom | 280/289 A |
| 1182752 | 3/1970 | United Kingdom | 297/250 |

Primary Examiner—John J. Love
Assistant Examiner—Eric D. Culbreth
Attorney, Agent, or Firm—Cullen, Sloman, Cantor, Grauer, Scott & Rutherford

[57] ABSTRACT

A child's car seat having front, rear and bottom walls, has an attachment for anchoring upon a shopping cart which includes a pair of spaced straps at their one ends anchored to the rear wall, extending forwardly underlying the bottom wall and at their free ends adjustably secured to a pair of strap fasteners upon the front wall. A pair of snap fasteners on the rear wall are adapted to interlock with a cross bar on the shopping cart, the free ends of the straps adapted to extend around and retainingly engage the push rod handle of the shopping cart.

4 Claims, 5 Drawing Figures

U.S. Patent  Jul. 8, 1986  4,598,945
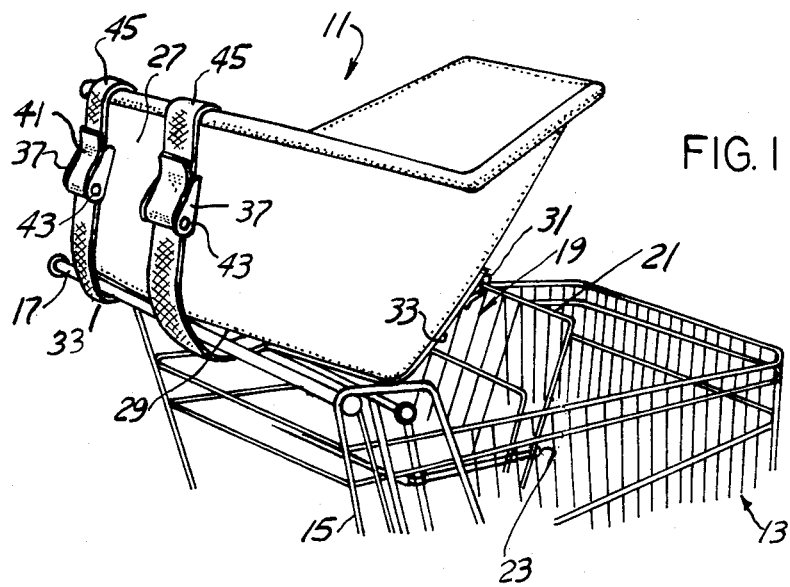
FIG. 1
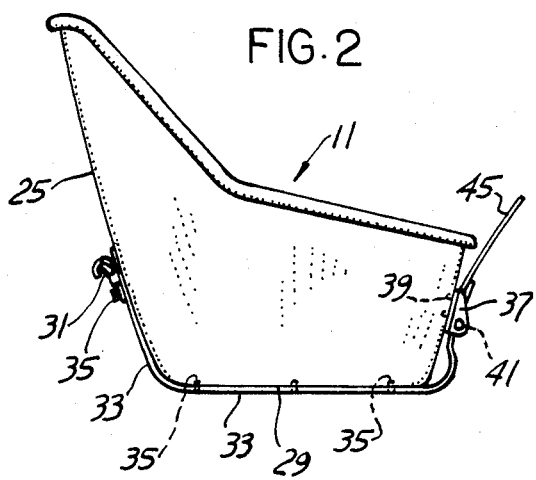
FIG. 2
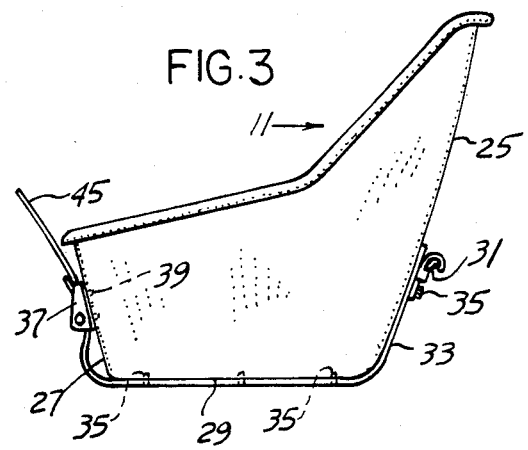
FIG. 3
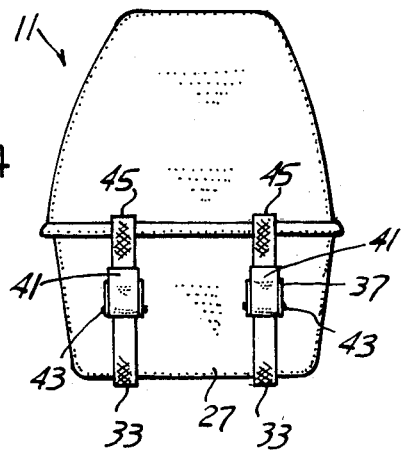
FIG. 4
FIG. 5

CHILD'S CAR SEAT WITH ATTACHMENT FOR SHOPPING CART

BACKGROUND OF THE INVENTION

Conventional shopping carts have push rod handles and forwardly thereof a pivotal swing frame which may be anchored in an open position with respect to the cart and wherein intermediate the top and bottom of the swing frame there is a child's seat supported on the cart and swing frame. Often there is also a strap by which a child or infant can be constrained upon such seat during shopping.

Often the strap for securing the child upon the shopping cart seat is insufficient to properly hold the child, and particularly infants in the proper upright or reclining position. Thus at least for infants or small children there exists the difficulty of lifting the child from a vehicle car seat and bringing the child into the market and seating and strapping the child thereon.

Conventional and known car seats particularly adapted for infants and small children normally have sufficient contour and anchor straps such as will comfortably and safely retain the child within the seat, and when in use in the car are adapted for anchoring to some portion of the conventional seatbelt system for vehicles.

Therefore there is a need for a child's car seat adapted for use in conjunction with a shopping cart and wherein the child is comfortably seated or supported in a reclining position therein and wherein such seat may be safely anchored and secured upon a shopping cart against accidental disassembly.

SUMMARY OF THE INVENTION

An important feature of the present invention is to provide an improved child's car seat which has thereon an attachment by which the car seat with the infant therein may be transferred from a vehicle car seat and supported and anchored upon a conventional shopping cart.

It is another feature to provide an attachment for a child's car seat and wherein a pair of laterally spaced straps are secured to the car seat which extend along the undersurface thereof and terminate in a pair of free ends adapted for fastening within a pair of laterally spaced strap anchors secured upon the front of the car seat.

Another feature is to provide a pair of laterally spaced snap fasteners upon the rear wall of the child's car seat so arranged that when the car seat has been mounted upon the rear portion of the shopping cart, the snap fasteners can interlockingly engage a transverse cross bar upon the shopping cart and wherein the free end portions of the straps will extend around and retainingly engage the shopping cart handle.

Another feature includes the anchoring of a pair of straps upon the rear wall of the car seat and wherein intermediate portions of the straps engage and are secured to the bottom wall of the car seat and the free ends of said straps extend forwardly of the bottom wall and are adapted for gripping within correspondingly spaced upwardly opening strap anchors upon the seat front wall. The laterally spaced snap fasteners are secured and interlocked with a cross bar on the shopping cart and the free ends of the straps snugly extend around and retainingly engage the handle of the shopping cart. This provides an effective means by which the child's car seat with the baby or child therein can be safely anchored upon the rear seat portion of a conventional shopping cart.

These and other objects and features will be seen from the following specification and claims in conjunction with the appended drawing.

THE DRAWING

FIG. 1 is a perspective view of a child's car seat with attachment for a shopping cart as mounted upon a conventional shopping cart fragmentarily shown.

FIG. 2 is a left side elevational view of the car seat shown in FIG. 1.

FIG. 3 is a right side elevational view thereof.

FIG. 4 is a front elevational view.

FIG. 5 is a rear elevational view.

It will be understood that the above drawing illustrates merely a preferred embodiment of the invention, and that other embodiments are contemplated within the scope of the claims hereafter set forth.

DETAILED DESCRIPTION OF AN EMBODIMENT OF THE INVENTION

Referring to the drawing, a child's car seat with attachment for shopping cart is generally indicated at 11 in FIG. 1 as mounted upon a conventional shopping cart 13 having suitable wheels and casters of a conventional construction, and not shown.

The shopping cart includes a framework 15 having a transverse push rod handle 17 fixed to the framework. Conventional shopping carts have upon the framework adjacent the rear end thereof a swing frame or pivot frame 19 pivotly mounted to its lower end to some portion of the cart framework on an axis parallel to handle 17. The conventional swing frame 19 has a top rod 21 or cross bar. The swing frame may be in the open seat position, shown in FIG. 1, resting against a suitable frame stop 23. When not in use, frame 21 may be pivoted rearwardly so as to engage a rear wall portion of the cart framework.

Though not shown in the drawing FIG. 1, pivotly interconnected with the swing frame 19 and a portion of the framework is a collapsable seat or platform, conventionally used in transporting children or an infant upon the cart and wherein some form of holding strap is employed.

The present child's car seat 11 includes rear wall 25, front wall 27 and bottom wall 29, being a conventional construction. A pair of laterally spaced snap fasteners or snaps 31 are secured upon rear wall 25 intermediate its top and bottom anchored by suitable fasteners or rivets 35.

In the illustrative embodiment, the one ends of corresponding laterally spaced flexible straps or belts 33 are similarly anchored to rear wall 25 using a suitable fastener such as fasteners 35, FIGS. 3 and 5. In the illustrative embodiment, the one ends of straps 33 underlie the corresponding laterally spaced snap fasteners 31 and are secured to the rear wall of the childs seat by the same fasteners 35.

The corresponding straps are laterally spaced and parallel and intermediate their ends extend under and engage bottom wall 29 of the car seat. In the illustrative embodiment, intermediate portions of the flexible straps 33 are secured to the undersurface of the bottom wall as by a series of longitudinally spaced fasteners or rivets 35 which extend through the straps and are secured to said bottom wall. Portions of the straps extend forwardly of bottom wall 29 and terminate in the free ends 45.

A corresponding laterally spaced pair of strap anchors 37 or buckles are mounted upon the front wall 27 intermediate the top and bottom thereof and secured thereto by suitable fasteners or rivets 39, FIGS. 2 and 3.

As is conventional with strap anchors of this type or buckles 37, there is employed a conventional cleat 41 pivotally mounted to the strap anchor at 41 which includes such sufficient serrations or frictional devices internally of the strap anchors such as will frictionally anchor the strap end 45 when drawn snugly through the strap anchor to the position as shown in FIG. 1. Normally, the conventional cleat 41 is spring biased to the locking position shown in the drawing.

In use of the present attachment for shopping carts the child is strapped into the car seat as is conventional. The car seat and child are removed from the car and transported for positioning over the rear section of the shopping cart such as shown in FIG. 1. Normally the rear wall 25 and portions of the bottom wall 29 bear against portions of the shopping cart. The snaps or snap fasteners 31 are positioned over and interlocked with the corresponding top rod or cross bar 21 forming a part of the swing frame 19. Adjacent portions of rear wall 25 bear against and along portions of rod 21. Forward portions of bottom wall 29 extend over push rod handle 17 intermediate its ends.

The corresponding forward free end portions 45 of the respective straps 33 snugly extend under the shopping cart handle 17; and the free ends are threaded up through the upwardly opening strap fasteners or buckles 37 and drawn snugly therethrough. The respective straps retainingly engage the handle 17 and effectively anchor and retain the childs car seat 11 upon the shopping cart.

Other details of the shopping cart are conventional and a description thereof is omitted. This construction includes the detail of the pivot or swing frame 19 at its lower end pivotally mounted to some portion of the framework 15. Frame 19 when in the open position engages the corresponding stops 23 on framework 15. Said stops may be opposed projections from opposite sides of the framework or alternately could be a transverse bar which spans rear portions of the shopping cart.

The present car seat attachment for shopping carts provides a convenient means by which the child as safely strapped within the car seat, the car seat may be removed from the vehicle, transported to a shopping cart and safely and securely interlocked and mounted thereon.

In order to remove the child's car seat, all that is necessary is to release the corresponding straps 33 from the strap anchors 37 and manually disengage the snap fasteners 31 from cross rod 21. The child's car seat can be placed back into the vehicle and suitably anchored in place as by the use of conventional seat belts normally used for anchoring such child's car seat upon the seat of a vehicle, often the front seat with the child facing rearwardly.

Straps 33 could be anchored only to the bottom wall 29 of child's car seat 11, and not extend over portions of rear wall 25.

Having described my invention, reference should now be had to the following claims.

I claim:

1. A child's car seat including front, rear and bottom walls;
   a pair of parallel laterally spaced flexible straps at their one end portions bearing against and secured to said rear wall;
   said straps extending forwardly and intermediate their ends underlying and bearing against said bottom wall, and terminating in a pair of free end portions forwardly of said bottom wall;
   a corresponding pair of laterally spaced strap anchors mounted upon and secured to said front wall, adapted to receive and adjustably grip the free end portions of said straps;
   and a pair of laterally spaced snap fasteners mounted upon and secured to said rear wall adapted for connection to and interlock with a cross bar of a shopping cart;
   said strap free end portions adapted to extend around and retainingly engage the handle of the shopping cart, said car seat spanning and supported upon the cross bar and handle.

2. In the car seat of claim 1, a series of longitudinally spaced fasteners extending through intermediate portions of said straps and secured to said bottom wall.

3. In the car seat of claim 1, said snap fasteners overlying and secured to the one end portions of said straps.

4. A child's car seat including front, rear and bottom walls;
   a pair of parallel laterally spaced flexible straps underlying, bearing against and secured to said bottom wall;
   said straps extending forwardly and terminating in a pair of free end portions forwardly of said bottom wall;
   a corresponding pair of laterally spaced strap anchors mounted upon and secured to said front wall. adapted to receive and adjustably grip the free end portions of said straps;
   and a pair of laterally spaced snap fasteners mounted upon and secured to said rear wall adapted for connection to and interlock with a cross bar of a shopping cart;
   said strap free end portions adapted to extend around and retainingly engage the handle of the shopping car, said car seat spanning and supported upon the cross bar and handle.

* * * * *